No. 696,732. Patented Apr. 1, 1902.
G. A. GOODSON.
DIFFERENTIAL LETTER SPACE REGISTER FOR COMPOSING MACHINES.
(Application filed Sept. 3, 1901.)
(No Model.) 7 Sheets—Sheet 1.

No. 696,732. Patented Apr. 1, 1902.
G. A. GOODSON.
DIFFERENTIAL LETTER SPACE REGISTER FOR COMPOSING MACHINES.
(Application filed Sept. 3, 1901.)
(No Model.) 7 Sheets—Sheet 2.

No. 696,732. Patented Apr. 1, 1902.
G. A. GOODSON.
DIFFERENTIAL LETTER SPACE REGISTER FOR COMPOSING MACHINES.
(Application filed Sept. 3, 1901.)
(No Model.) 7 Sheets—Sheet 3.

Fig. 3.

No. 696,732.  
G. A. GOODSON.  
DIFFERENTIAL LETTER SPACE REGISTER FOR COMPOSING MACHINES.  
(Application filed Sept. 3, 1901.)

(No Model.)  
7 Sheets—Sheet 4.

Fig. 4.

Witnesses  
Harry Kilgord.  
Robert Otto.

Inventor.  
George A. Goodson.  
By Williamson & Merchant  
Attorneys.

No. 696,732. Patented Apr. 1, 1902.
G. A. GOODSON.
DIFFERENTIAL LETTER SPACE REGISTER FOR COMPOSING MACHINES.
(Application filed Sept. 3, 1901.)
(No Model.) 7 Sheets—Sheet 5.

Witnesses
Harry Kilgore
Robert Otto

Inventor
George A. Goodson.
By Williamson & Merchant
Attorneys.

No. 696,732. Patented Apr. 1, 1902.
G. A. GOODSON.
DIFFERENTIAL LETTER SPACE REGISTER FOR COMPOSING MACHINES.
(Application filed Sept. 3, 1901.)
(No Model.) 7 Sheets—Sheet 7.

Witnesses
Harry Kilgord
Robert Otto.

Inventor
George A. Goodson,
By Williamson & Merchant
Attorneys

UNITED STATES PATENT OFFICE.

GEORGE ARTHUR GOODSON, OF MINNEAPOLIS, MINNESOTA, ASSIGNOR TO THE GOODSON GRAPHOTYPE COMPANY, OF NEW YORK, N. Y., A CORPORATION OF NEW JERSEY.

DIFFERENTIAL LETTER-SPACE REGISTER FOR COMPOSING-MACHINES.

SPECIFICATION forming part of Letters Patent No. 696,732, dated April 1, 1902.

Application filed September 3, 1901. Serial No. 74,062. (No model.)

*To all whom it may concern:*

Be it known that I, GEORGE ARTHUR GOODSON, a citizen of Canada, residing at Minneapolis, in the county of Hennepin and State of Minnesota, have invented certain new and useful Improvements in Differential Letter-Space Registers for Composing-Machines; and I do hereby declare the following to be a full, clear, and exact description of the invention, such as will enable others skilled in the art to which it appertains to make and use the same.

My invention has for its object to provide an improved differential letter-space register for composing-machines.

This improved register was especially designed for use on what is known as the "Goodson composing-machine," which composing-machine is disclosed most nearly in its commercial form in my prior United States patent, No. 606,007, of date June 21, 1898. Said composing-machine disclosed in said Patent No. 606,007 produces a perforated or punctured strip, representing the composition, which strip subsequently comes into use on what is known as the "Goodson type casting and setting machine" for controlling the actions of said machine, so as to produce justified lines of individual type. Said Goodson type casting and setting machine is disclosed most nearly in its commercial form in my prior United States patent, No. 609,098, of date August 16, 1898. The type cast and set on said machine disclosed in said Patent No. 609,098, including quads as type, are in running width of face all multiples of a common unit, and the type are set in justified lines of some predetermined length as measured in the common unit. In said Goodson composing-machine an ordinary type-writing machine is provided with electric connections to a strip-perforator for producing the representative strip under the action of the type-writing machine. In order to provide for the justification of the line of type on the type casting and setting machine, holes are made in the strip, representing the amount of justification, or the number of units of shortage or excess requiring distribution in order to justify the line. Otherwise stated, the strip made on the composing-machine is fed into the type casting and setting machine in the reverse order of its making, and the holes made in said strip to represent the amount of justification required come first into action on the type casting and setting machine before any type are cast and are operative to control the setting of a justifier in such a manner that quads will be made on the type-casting machine of the proper size to justify the line. Hence on this composing-machine it is necessary to employ a differential register of some kind which will indicate to the eye of the operator the amount of letter-space which has been represented on the strip when the line of composition is broken in order to ascertain the amount of letter-space by way of shortage or excess which will require distribution in order to justify the line. It is highly desirable to have a register which will indicate to the operator the amount of letter-space represented by the line of composition and also the amount of the shortage or excess requiring distribution for purposes of justification. Otherwise stated, it is desirable to avoid the necessity for any mental calculation on the part of the operator. Such a register was disclosed in my prior patent, No. 605,957, of date June 21, 1898, entitled "Differential letter-space register for composing-machines."

Different publications employ columns differing in width, or, otherwise stated, the length of the lines vary to a considerable extent in different publications and sometimes in the same publication. It is therefore desirable to have a register which can be readily and reliably set to indicate the letter-space of lines of any desired length and at the same time to indicate reliably the shortage or excess of letter-space expressed in the common unit which will require distribution in order to justify the line.

My present invention has for its object to meet these conditions and is in the nature of an improvement on the invention disclosed in my said prior patent, No. 605,957, of date June 21, 1898. The present machine does exactly the same work by modified and improved mechanism and also is capable of ready adjustment as required to afford the desired readings or indications, as above stated, for lines varying greatly in length as expressed in the common unit.

To the ends above noted my invention consists of the novel devices and combinations of devices which will be hereinafter described, and defined in the claims.

The invention is illustrated in the accompanying drawings, wherein like notations refer to like parts throughout the several views.

In said drawings, Figs. 3 and 4 are taken on the same section-line, but looking in opposite directions.

To the face of a suitable clock-like frame or casing $a$ are secured a pair of dial-plates $b$ and $c$. The dial $b$ is of circular form and is graduated to indicate units sufficient for the longest line of composition that would be desired. The graduations on the dial $b$ denote units, but the readings are only printed thereon in multiples of ten.

The dial-plate $c$ is of segmental form and is graduated and marked with readings to denote single units from "−8" to "+15." The dial-plate $c$ is located directly over the dial-plate $b$, and the pointers of the two dial-plates move in opposite directions. The pointer $b'$, which coöperates with the dial-plate $b$, moves clockwise, or from the left toward the right, in its counting action. The pointer $c'$, which coöperates with the segmental dial-plate $c$, moves in the opposite direction, or from the right toward the left, so as to count backward, or from the highest algebraic number, "+15," toward the lowest algebraic number, or "−8." The said algebraic numbers, ranging from "−8" to "+15," constitute what may be called the "margin of justification" provided for in the Goodson system. Otherwise stated, in the Goodson system in the machines disclosed in the prior patents hereinbefore identified provision is made for the distribution of twenty-three units of letter-space for purposes of justification. Of these twenty-three units provision is made for the distribution of fifteen units by way of addition and eight units by way of subtraction. Otherwise stated, the quads may be increased above normal, so as to provide for the distribution of a shortage of fifteen units, if necessary, or the quads may be decreased below the normal size, so as to provide for the distribution of an excess of eight units, if necessary.

The dial $b$, with its pointer $b'$ and the mechanism for operating the same, constitutes what may be conveniently called the "primary counter," and the dial $c$, with its pointer $c'$ and the means for operating, constitutes what may be conveniently called the "secondary counter." The primary counter counts from the start to the end of the composition. The secondary counter does not begin to count until some predetermined step of the counting movement of the primary counter, or, otherwise stated, the secondary counter only counts within the margin of possible justification.

The secondary counter is driven from the primary counter by an adjustable driving device, which may be so set as to cause the primary counter to begin to operate the secondary counter at any desired predetermined step in the counting action of the primary counter, thereby adapting the register for use to afford the proper readings for lines of any desired predetermined length.

With this preliminary statement of the general actions the details may be readily followed. The pointer $b'$ is secured to turn with an arbor or shaft $b^2$, which is suitably journaled in bearings fixed to or forming a part of the main frame $a$. Said arbor $b^2$ inside the casing is provided with a main or comparatively large spur gear-wheel $b^3$, keyed or otherwise made fast thereto. Said spur gear-wheel $b^3$ is in mesh with a pinion or smaller spur gear-wheel $g$, which is keyed or otherwise made fast to a shaft $g'$, journaled in suitable bearings fixed to or forming a part of the main frame $a$. The shaft $g'$ has also keyed or otherwise made fast thereto a ratchet-wheel $g^2$.

A three-armed pawl-lever $g^3$ is loosely pivoted on the shaft $g'$ and has pivoted to its uppermost or head end a spring-pawl $g^4$ for coöperation with the teeth of the ratchet-wheel $g^2$. To the depending or approximately vertical arm of the pawl-lever $g^3$ is pivoted a link $g^5$, connecting said pawl-lever with an armature-lever $k$. The armature-lever $k$ is subject to a magnet $k'$ and a coöperating spring $k^2$, which is adjustable in tension. The lowermost or tail end of the pawl-lever $g^3$ moves over a guide-plate $k^3$, in which are mounted a series of five stops $k^4$ for variably intercepting the pawl-lever in any of five different positions. Of said stops $k^4$ four thereof are movable and one thereof is fixed, the fixed member, as shown, being at the top of the series. The movable members of said stops $k^4$ are carried on the ends of a corresponding series of armature-levers $k^5$, which in turn are subject to a corresponding series of armatures $k^6$.

With the devices so far described it is obvious that every time the main or large magnet $k'$ is energized the pawl-lever $g^3$ will be rocked in a direction to throw the spring-pawl $g^4$ downward or over the teeth of the ratchet-wheel $g^2$. The movable members of the stops $k^4$ have their upper ends normally out of the path of the tail end of the pawl-lever $g^3$, but may be thrown upward into the path of said lever under the action of the magnets $k^6$. If none of the magnets $k^6$ are energized, then the pawl-lever will move to its limit or until the tail end of the lever strikes the uppermost or fixed member of the series of stops $k^4$, which fixed member always stands in the path of the tail end of the pawl-lever. Hence whenever the main magnet $k'$ is energized the pawl-lever $g^3$ will move the spring-pawl $g^4$ backward over a greater or less number of the teeth of the ratchet-wheel $g^2$, according to which member of the series of stops $k^4$ is caused or permitted to intercept the pawl-lever, and when the magnet $k'$ is deenergized the spring $k^2$ will impart the reverse or feeding motion to the pawl-lever $g^3$, thereby moving the ratchet-wheel $g^2$ and all the parts connected therewith a corresponding number of steps. A retaining spring-pawl $g^6$ holds the ratchet-wheel $g^2$ in its set or fed position. The feed-pawl $g^4$ is limited in its forward or feeding movement by a combined banking and locking stop $g^7$, which cooperates with the head of the pawl $g^4$ not only to limit the forward throw of the pawl, but to lock the pawl to the ratchet-wheel, thereby preventing any overthrow or any backlash of the ratchet-wheel $g^2$ and parts operated thereby.

The electric connections for the magnets $k'$ and $k^6$ are or may be exactly the same as those fully disclosed in my prior patent, No. 606,007, of June 21, 1898, and in view of the full disclosure made therein it has not been deemed necessary to illustrate the same for the purposes of this case. It is thought sufficient to state that all the keys of the type-writer keyboard with respect to the letter-space required for the characters represented thereby and for the normal word-space may be classified into five groups ranging from two to six units. In that classification the normal word-space would be two units. The movable members of the stops $k^4$ correspond to four of said groups and the uppermost or fixed member of said stops $k^4$ correspond to the fifth or group largest in size of face. The different groups of keys each have the proper electric connection to the proper corresponding magnet $k^6$, and the main or feed magnet $k'$ is on the common return-wire for all the stop-magnets $k^6$. Hence whenever any key or space-bar at the keyboard is struck the proper electric connections will be established to energize the proper member of the magnets $k^6$, if necessary, to throw up the proper member of the movable stops $k^4$ to variably intercept the pawl-lever $g^3$ as required to impart the proper corresponding feed movement to the ratchet-wheel $g^2$. If the key struck be in the group having the largest size of face, then none of the magnets $k^6$ will be energized, but the proper connections will be established to energize the feed-magnet $k'$, and the pawl-lever $g^3$ will be intercepted by the fixed member of the movable stops $k^4$, this securing the largest feed movement of the ratchet-wheel $g^2$ under the action of the spring $k^2$ when the magnet $k'$ is deenergized.

Figure 1:
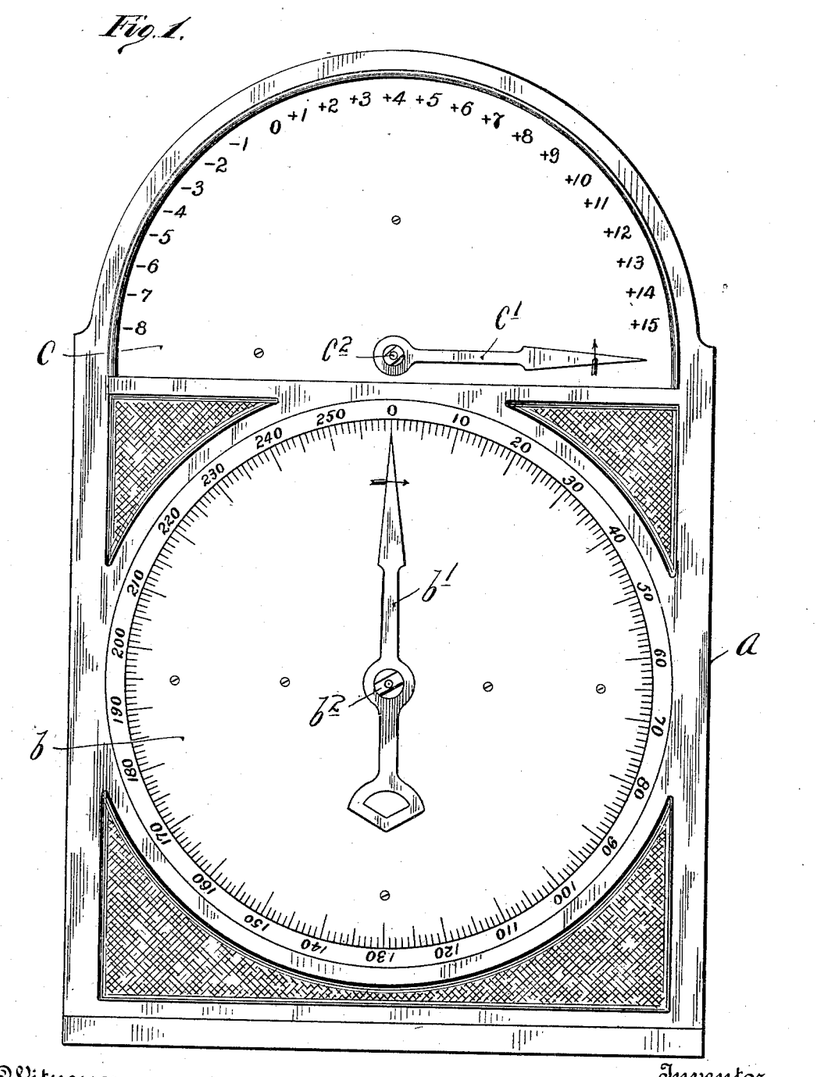
Figure 1 is a view in front elevation, showing the register detached.
Figure 2:
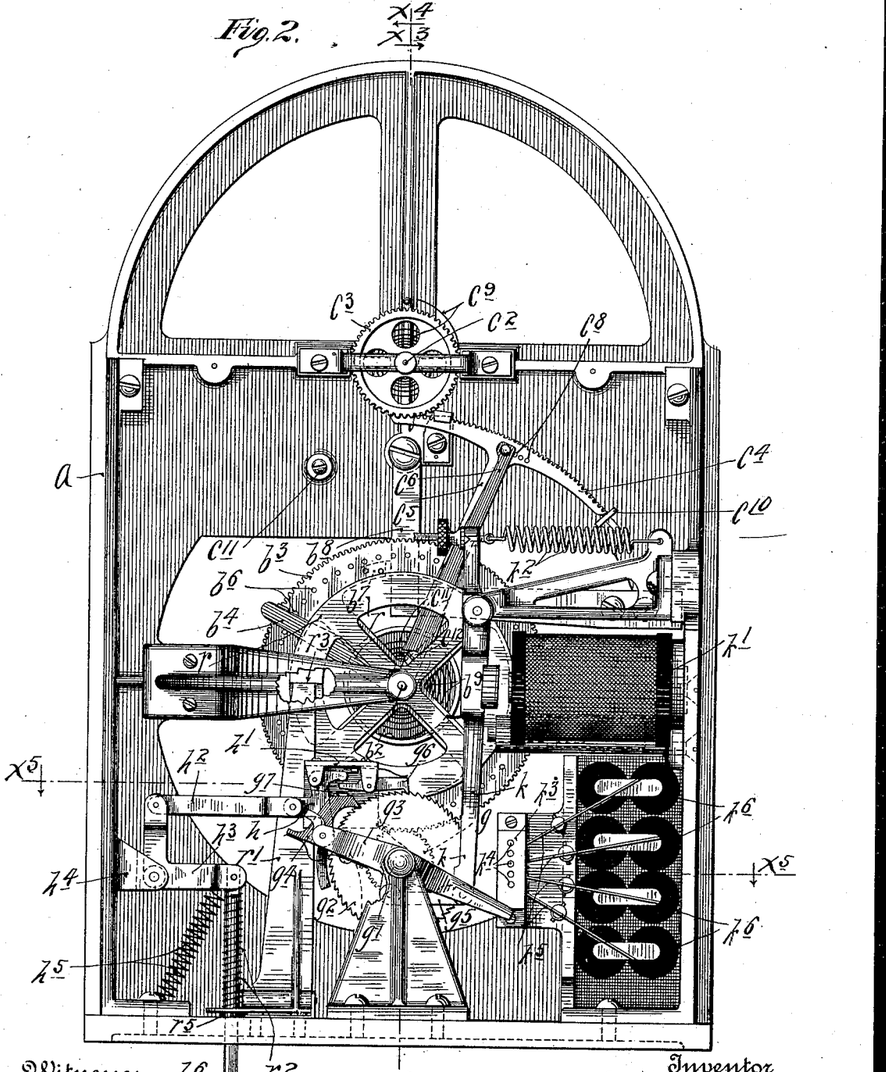
Fig. 2 is a view showing the register in rear elevation with the removable part of the cover or casing removed from the main part or frame portion of the casing.
Figure 3:
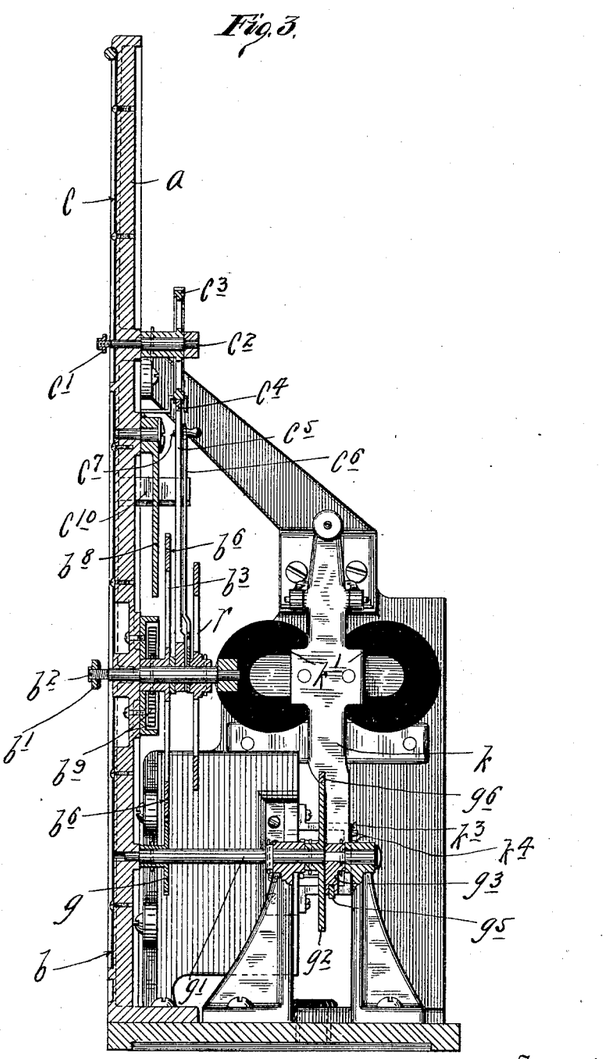
Fig. 3 is a central vertical section on the line $x^3$ $x^3$ of Fig. 2.
Figure 6:
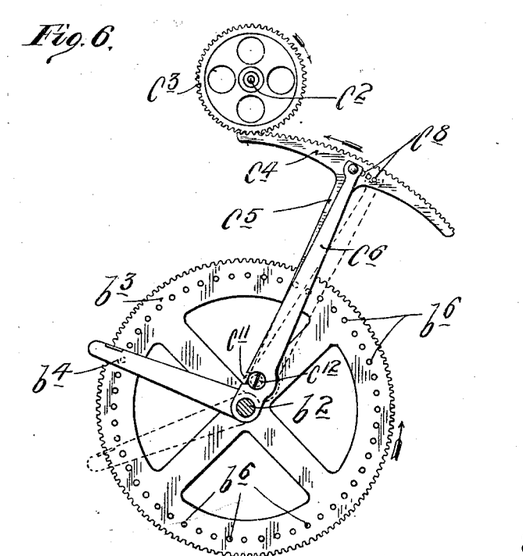
Fig. 6 is a detail showing the large or main gear-wheel of the primary counter and the adjustable driving device for the secondary counter in relation thereto with said parts detached and shown as they would appear in plan view when laid down flatwise.

The rotation of the ratchet-wheel $g^2$ through the pinion or small spur gear-wheel $g$ of course rotates the large spur gear-wheel $b^3$ and the arbor $b^2$, which in turn moves the pointer $b'$ of the primary counter in the direction required. Pivoted to the arbor $b^2$, alongside the rear face of the gear-wheel $b^3$, is a driving-arm $b^4$, shown as provided with a pin $b^5$, adapted to engage with any one of a series of holes $b^6$, formed in the profile face of said wheel $b^3$, for locking said arm thereto in any desired driving position, as best shown in Figs. 2 and 6.

The pointer $c'$ of the secondary counter is attached to an arbor $c^2$, which is journaled in suitable bearings fixed to or forming a part of the main frame $a$, and has keyed or otherwise made fast thereto a spur gear-wheel $c^3$. Said spur gear-wheel $c^3$ is in mesh with the segmental gear $c^4$, carried at the upper or outer end of a radius bar or arm $c^5$, which radius-bar is pivoted to the arbor $b^2$ of the primary counter. A spring-arm $c^6$ is also pivoted to said arbor $b^2$ and is provided at its outer end with a pin $c^7$, adapted to engage with any one of a series of five holes $c^8$ in the segmental gear $c^4$. The spring-arm $c^6$ is so related to the radius-bar $c^5$ and the holes $c^8$ are so positioned in the segmental gear $c^4$ that the said spring-arm $c^6$ may be given, as shown, five steps of adjustment beyond that edge of the radius-bar $c^5$ toward the driving-face of the arm $b^4$, carried by the spur gear-wheel $b^3$. The spur gear-wheel $c^3$ of the secondary counter is subject to a barrel-spring $c^9$, which tends to throw the segmental gear $c^4$ into its initial or normal position, with one end thereof resting against a fixed stop $c^{10}$. At the proper time in the rotation of the spur gear-wheel $b^3$ the driving-arm $b^4$ carried thereby will come in contact with the spring-arm $c^6$, and thereafter will move the segmental gear $c^4$ and cause the same to operate the secondary counter. The driving-arm $b^4$ adjusts in multiples of five units and the spring-arm $c^6$ adjusts in single units.

If the column width or predetermined line length be one hundred and fifty units, for example, then the parts $b^4$ and $c^6$, one or both, as may be necessary, would be set relative to the spur gear-wheel $b^3$ and the segmental wheel $c^4$, that the primary counter would begin to operate the secondary counter at its one hundred and thirty-sixth step or fifteen steps before the end of the predetermined line and might continue to so operate the secondary counter until the predetermined line had been overrun to the extent of eight units or, in other words, until the primary counter should have registered one hundred and fifty-eight units and the secondary counter should have indicated minus eight units.

Suppose that the predetermined line next desired should be one of one hundred and fifty-five units. Then by shifting the arm $b^4$ backward, so that the pin thereof will engage with the next rearward member of the holes $b^6$ in the spur gear-wheel $b^3$, the primary counter will begin to operate the secondary counter five units later or at the one hundred and forty-first step of its motion, thereby causing the justification-dial $c$ to give the same relative readings as before. In a similar way by adjusting the arm $b^4$ alone the driving device for operating the secondary counter from the primary counter may be set for adapting the register to any desired line differing from the last previous line for which the machine was set by five units or any multiple thereof. If it is desired to adjust the machine for a difference in lines of less than five units, then the adjustment is effected by shifting the arm $c^6$ so as to cause the pin $c^7$ to engage with the proper member of the holes $c^8$ in the segmental gear $c^4$.

For example, suppose the predetermined line for which the machine had last been used was one having a length of one hundred and fifty units and it is desired to use the machine for one having one hundred and fifty-one units. Let it also be assumed that when the machine was in use for a line of one hundred and fifty units the pin $c^7$ of the arm $c^6$ was in that member of the holes $c^8$ on the segment $c^4$ located nearest to the stop $c^{10}$ or initial position of the segment $c^4$. Then by changing the pin $c^7$ to the hole next in order or next most remote from the stop $c^{10}$ it is of course obvious that the primary counter will not begin to move the secondary counter until one step later in its feed movement. Still otherwise stated, when the line was one hundred and fifty units the primary counter began to move the secondary counter at the one hundred and thirty-sixth step of its feed movement, and after the change just hereinbefore described the primary counter would begin to move the secondary counter at the one hundred and thirty-seventh step of the primary counter's movement. Since the adjustment in multiples of five can be made by resetting the arm $b^4$ of the spur gear-wheel $b^3$ and since an adjustment in units from one to five may be made by properly setting the arm $c^6$ in respect to the segmental gear $c^4$, it follows that provision is made for a universal adjustment of the driving device which imparts motion to the secondary from the primary counter. The register may, therefore, be adapted to lines of any desired length by simply adjusting said driving device in one or both of the ways described, and in all the adjustments the secondary counter or justification-indicator will bear the same relation to the primary counter for giving the readings required therefrom for purposes of justification. A stop-stud $c^{13}$ in the path of the radius-bar $c^6$ limits the possible forward or counting motions of both counters.

Figure 4:
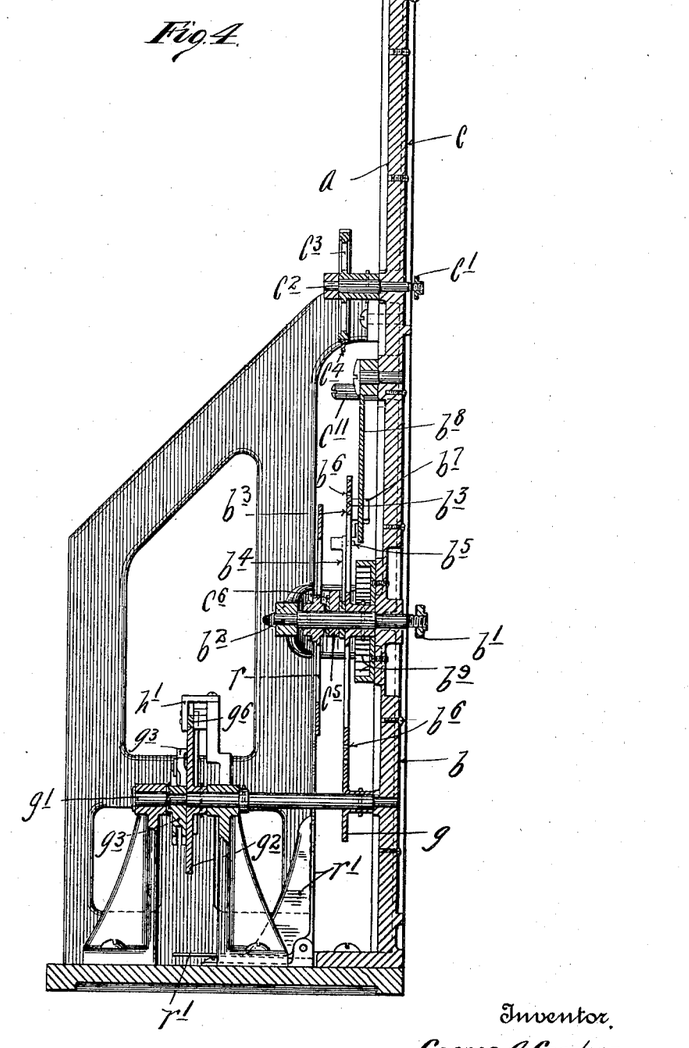
Fig. 4 is a similar view on the line $x^4$ $x^4$ of Fig. 2.
Figure 5:
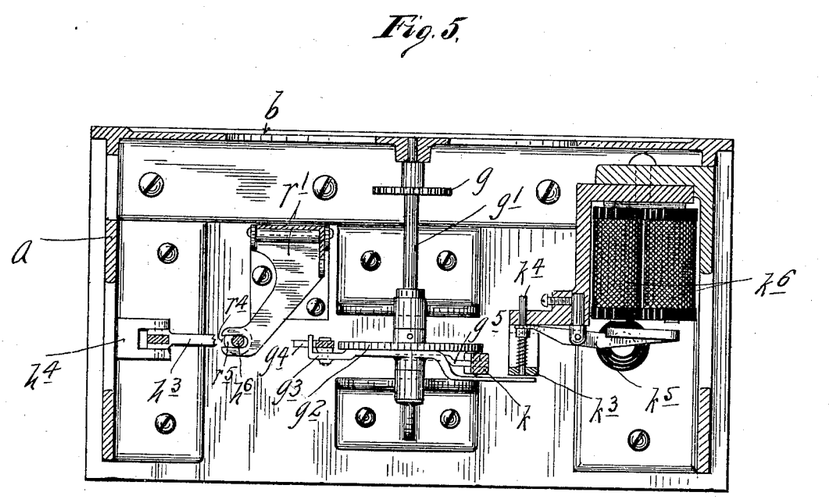
Fig. 5 is a horizontal section on the line $x^5$ $x^5$ of Fig. 2.

The spur gear-wheel $b^3$ of the primary counter is provided on its outer or front profile face with a stop-lug $b^7$, which when the primary counter is in its initial position abuts against a fixed stop $b^8$, as shown in Fig. 4, removably secured to the main frame $a$. The spur gear-wheel $b^3$ is subject to a barrel-spring $b^9$, which is wound up under the feed motion of the ratchet-wheel $b^2$ and which returns all the parts of the primary counter to their initial or normal starting positions whenever the ratchet is released from its feeding and retaining pawls $g^4$ and $g^5$.

A three-armed releasing-lever $h$ has its head pivoted to the same support $h'$ to which is pivoted the retaining-pawl $g^5$ and has its horizontal arm connected by a link $h^2$ to the upper arm of a bell-crank lever $h^3$, having its elbow pivoted to the bearings $h^4$, projecting from a part of the fixed frame $a$. The uppermost arm or head of the releasing-lever $h$ overreaches the tail end of the retaining-pawl $g^5$, and its downwardly-extended or long arm underreaches a laterally-projecting part of the feed-pawl $g^4$, with said parts all so related that when the bell-crank lever $h^3$ is rocked upward, thereby pulling the link $h^2$ and releasing-lever $h$ laterally outward, the two pawls $g^4$ and $g^5$ will be released from the ratchet-wheel $g^2$, thereby allowing the springs $b^9$ and $c^9$ to restore all the parts of the register to their normal or initial positions. The bell-crank lever $h$ is subject to a spring $h^5$, tending to hold the same in its normal position, and to a releasing-rod $h^6$ for raising said lever $h^3$ against the tension of said spring $h^5$.

Figure 7:
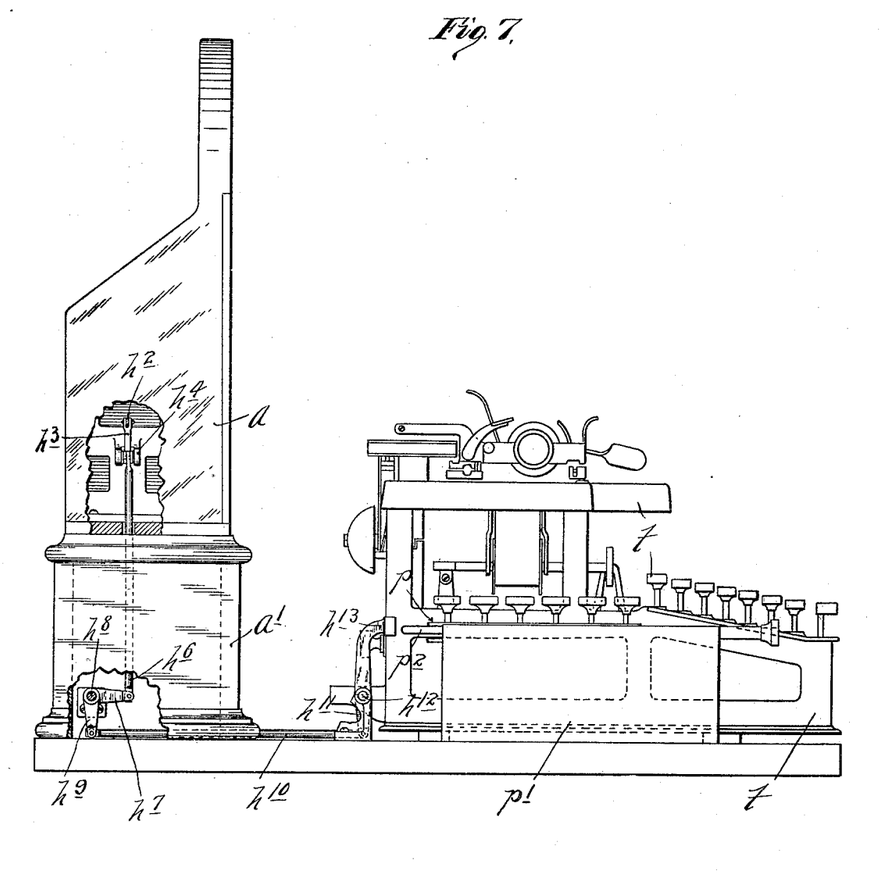
Fig. 7 is a view in end elevation showing the register in its preferred location in respect to the type-writer and the traveling keyboard of the justification-box, some of the parts being shown in diagram only and others removed.
Figure 8:
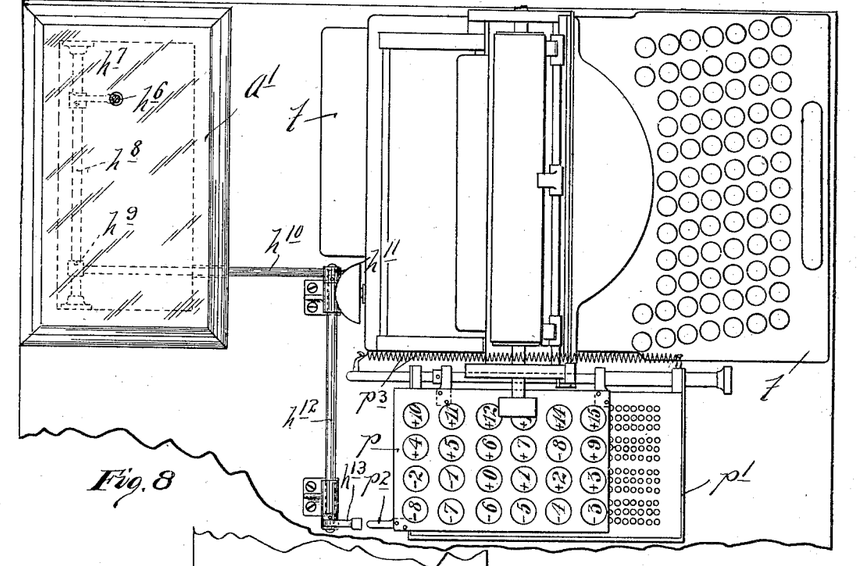
Fig. 8 is a view, chiefly in diagram, showing some of the parts illustrated in Fig. 7 in plan.
Figure 9:
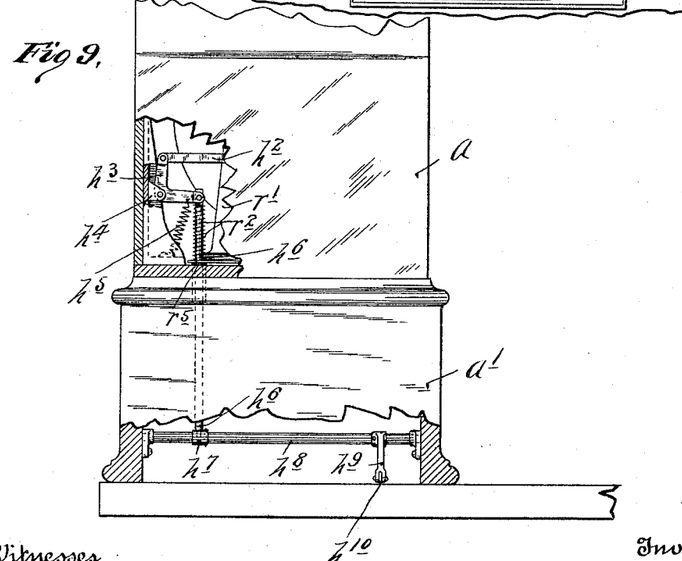
Fig. 9 is a view in rear elevation with some parts broken away, showing some of the parts illustrated in Figs. 7 and 8.

The releasing devices above described might of course be operated by hand. It is desirable, however, to minimize or eliminate all hand motions otherwise than those required to manipulate the keys of the type-writer. Hence in this instance I provide means for effecting an automatic release of the counting devices under the action of the traveling keyboard $p$ (shown in Figs. 7 and 8) and constituting a part of the justifier used on the composing-machine, as disclosed in my prior patent, No. 606,007, hereinbefore noted. As fully described in said Patent No. 606,007, the said traveling keyboard $p$ is set by hand in an initial or starting position and moved forward step by step under an escapement action over the underlying connection-box $p'$ whenever a word-space is struck at the type-writer $t$. I attach to the end of said traveling keyboard $p$ a projection $p^2$, which when said traveling keyboard is pushed rearward to its limit or one step beyond its initial or starting position will actuate proper connections to effect the release of the counting devices. As shown, the projection $p^2$ abuts against the upper arm $h^{13}$ of a rock-shaft $h^{12}$, journaled in suitable bearings and having a downwardly-extended arm $h^{11}$, connected by a rod $h^{10}$ with an arm $h^9$ on a rock-shaft $h^8$, located within the subbase $a'$, on which the register-frame $a$ is mounted. The rock-shaft $h^8$ is provided with a horizontal arm $h^7$, connected to the lower end of the releasing-rod $h^6$, all as best shown in Figs. 7, 8, and 9.

The traveling keyboard $p$ of the justifier (shown in Figs. 7 and 8) can be thrown rearward beyond its initial position against the tension of its retracting or feed spring $p^3$, and then when the operator lets go of the same it immediately moves forward one step under the action of said spring to assume its initial or starting position. Hence said traveling keyboard can be used, as described, to effect the release of the register-ratchet and will, nevertheless, assume an initial or set position, which does not prevent the pawls of the register-ratchet assuming their normal or working positions under the action of gravity and the spring $h^5$.

In order to check the return motion of the parts of the register under the tension of the springs $b^9$ and $c^9$ and in order to prevent backlash therefrom at the limit of the return movements, I provide a friction-brake applicable to the primary counter. For this purpose I have shown on the arbor $b^2$ a friction disk or wheel $r$, against which may act the upper end of a bell-crank spring-rocker $r'$, which has its elbow pivoted to the base of the casing $a$, as best shown in Fig. 2. The horizontal arm of the bell-crank spring-rocker $r'$ is bifurcated or provided with a slot $r^4$, through which passes the releasing-rod $h^6$. Said releasing-rod $h^6$ is provided with a collar $r^5$, directly underlying the horizontal arm of said rocker $r'$. A light spring $r^2$ encircles the releasing-rod $h^6$ between the releasing bell-crank lever $h^3$ and the upper face of the horizontal arm of the spring-rocker $r'$, and hence this spring $r^2$ will always hold the bell-crank spring-rocker $r'$ with its horizontal arm pressed downward to its limit against the collar $r^5$ on the rod $h^6$. It follows that when the releasing-rod $h^6$ is in its lowermost or normal position the upper end of the spring-rocker $r'$ will be held away from the friction disk or wheel $r$. Hence during the counting action of the parts the brake is idle. When, however, the rod $h^6$ is raised to its uppermost limit, as is required for releasing the pawls from the feed-ratchet, the collar $r^5$ will raise the horizontal arm of the bell-crank spring-rocker $r'$, and thereby throw the upper end or tip of the vertical arm of said rocker against the face of the friction-disk $r$ and put the same under slight friction. This will check the return motion of the parts under the action of the springs $b^9$ and $c^9$, and when the parts reach their normal position the upper end or tip of the spring-rocker $r'$ will catch under a shallow shoulder or notch $r^3$, provided on the profile face of the disk $r$, and thereby prevent any backlash of the parts.

Respecting the spring-finger $c^6$, it should have been noted that the same is provided with an open slot $c^{11}$, through which passes the shank of a set-screw $c^{12}$, as best shown in Fig. 6. Said screw $c^{12}$ is tapped into the radius-bar $c^5$, and the head of the screw embraces the outer face of the spring-finger $c^6$, thereby serving to take the cramp under the spring motion of said parts $c^6$ when said spring-finger $c^6$ is sprung outward to shift the pin $c^7$ from one to another of the holes $c^8$ in the radius-bar $c^5$.

As in my prior patent, No. 606,007, the notations on the dial of the secondary or justification counter of the register correspond to the notations on the keys of the traveling keyboard $p$ of the justifier used on the composing-machine and indicated in Figs. 7 and 8 of the drawings. Hence, as in said patent, when the operator on the type-writing machine reaches the place where he must break the line of composition he glances at the secondary counter or justification-indicator and the pointer shows him the proper key of the traveling keyboard which he must strike in order to make the justification-holes in the strip through the connections from said justification-box $p'$ to the strip-perforator, all as indicated in my said prior patent.

It will of course be understood that the details of the construction of my improved register herein disclosed may be varied without departing from the spirit of my invention. It will be further understood that the improved register herein disclosed, while especially designed for use in the Goodson system of machines for the production of justified lines of individual type, is capable of general application to composing-machines.

What I claim, and desire to secure by Letters Patent of the United States, is as follows:

1. A register for composing-machines, which register has, in combination, a primary units-counter, a secondary units-counter, or justification-indicator, and an adjustable driving device, for operating the secondary counter from the primary counter, whereby the primary counter may be made to begin to move the secondary counter at any desired step of the primary counter's movement, thus adapting the register for lines of different length, substantially as described.

2. A register for composing-machines, which register has, in combination, a primary units-counter, a secondary units-counter or a justification-indicator, and a driving device for operating the secondary counter from the primary counter, which driving device has a twofold or double adjustment, to wit, one adjustment in units, within a limited range, and another adjustment in multiples of the range limit of said unit adjustment, substantially as and for the purposes set forth.

3. In a composing-machine, having a traveling element under the control of the operator at the keyboard, of a differential letter-space register, and releasing connections for permitting the counting devices of said register to return to their normal or initial starting positions, which releasing connections are operated automatically from said traveling element of the composing-machine, substantially as and for the purpose set forth.

4. In a letter-space register, the combination with the counting devices, of a friction-brake operative on some movable element of the counting devices, to check the return motion and prevent any backlash of said counting devices, substantially as described.

5. In a letter-space register, the combination with counting devices subject to springs for returning the same to their normal or initial starting positions, of ratchet and pawl devices for moving said counting devices against the tension of said springs, in the counting action, and an automatic friction-brake operative on some movable member of said counting devices for checking the return motion and preventing backlash of said counting devices, substantially as described.

6. In a letter-space register, the combination with counting devices subject to springs for returning the same to their normal or initial starting positions, of ratchet and pawl devices for moving the counting devices against the tension of said springs, in the counting action, a friction-brake for action on said counting device during the return motion thereof only, and a releasing device operative to release the pawls from the ratchet and to set the brake, substantially as described.

7. In a letter-space register, the combination with the primary counter having the main gear-wheel $b^2$, of the secondary counter having the gear-wheel $c^3$ and the intermediate driving device, for operating the secondary from the primary counter, comprising a driving-arm pivoted to the arbor of the primary counter and adapted to be locked in different adjustments to said gear-wheel $b^2$, the radius-bar $c^5$ pivoted to the arbor of the primary counter and having the secondary gear $c^4$ in mesh with the gear-wheel $c^3$ of the secondary counter and the spring-arm $c^6$ also pivoted to the arbor of the primary counter and adapted to be locked to said segment $c^4$, in different adjustments, all for coöperation, substantially as described.

In testimony whereof I affix my signature in presence of two witnesses.

GEORGE ARTHUR GOODSON.

Witnesses:
CHAS. E. HUNTER,
JAS. F. WILLIAMSON.